United States Patent
Bernard et al.

(10) Patent No.: US 11,664,516 B2
(45) Date of Patent: May 30, 2023

(54) ASSEMBLY COMPRISING A SOEC/SOFC-TYPE SOLID OXIDE STACK, A CLAMPING SYSTEM, AND A HEAT EXCHANGE SYSTEM

(71) Applicant: COMMISSARIAT A L'ENERGIE ATOMIQUE ET AUX ENERGIES ALTERNATIVES, Paris (FR)

(72) Inventors: Charlotte Bernard, Contamine sur Arve (FR); Michel Planque, Seyssins (FR); Guilhem Roux, Saint-Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/954,888

(22) PCT Filed: Dec. 18, 2018

(86) PCT No.: PCT/FR2018/053385
§ 371 (c)(1),
(2) Date: Jun. 17, 2020

(87) PCT Pub. No.: WO2019/122697
PCT Pub. Date: Jun. 27, 2019

(65) Prior Publication Data
US 2020/0403261 A1    Dec. 24, 2020

(30) Foreign Application Priority Data
Dec. 19, 2017  (FR) ..................... 17 62507

(51) Int. Cl.
*H01M 8/1213*     (2016.01)
*H01M 8/2432*     (2016.01)
(Continued)

(52) U.S. Cl.
CPC ............. *H01M 8/1213* (2013.01); *C25B 1/04* (2013.01); *C25B 9/70* (2021.01); *C25B 15/08* (2013.01);
(Continued)

(58) Field of Classification Search
None
See application file for complete search history.

(56) References Cited

U.S. PATENT DOCUMENTS

| 5,330,858 A | 7/1994 | Shundou et al. |
| 8,945,356 B2 | 2/2015 | Le Gallo et al. |

(Continued)

FOREIGN PATENT DOCUMENTS

| DE | 42 17 892 A1 | 12/1992 |
| EP | 2 860 807 A1 | 4/2015 |

(Continued)

OTHER PUBLICATIONS

Melone, Larry, When and How Should Washers Be Used, Apr. 18, 2016, MelFast (Year: 2016).*

(Continued)

*Primary Examiner* — Ula C Ruddock
*Assistant Examiner* — Mary Grace Byram
(74) *Attorney, Agent, or Firm* — Oblon, McClelland, Maier & Neustadt, L.L.P.

(57) ABSTRACT

An assembly includes an SOEC/SOFC-type solid oxide stack, a clamping system for clamping the stack, including at least two clamping rods that can be used to assemble upper and lower clamping plates, and a coupling system for high-temperature fluid-tight coupling of the stack to a heating system for supplying and discharging gas. The coupling system includes a collector with collection ducts for supplying and discharging gas, each provided with a collecting port positioned facing a corresponding communication port (Continued)

of at least one of the upper and lower clamping plates, and seals each placed between a collecting port and a corresponding communication port.

21 Claims, 8 Drawing Sheets

(51) Int. Cl.
*H01M 8/0282* (2016.01)
*H01M 8/0247* (2016.01)
*H01M 8/04014* (2016.01)
*H01M 8/0276* (2016.01)
*C25B 15/08* (2006.01)
*C25B 1/04* (2021.01)
*C25B 9/70* (2021.01)
*H01M 8/2475* (2016.01)
*H01M 8/248* (2016.01)
*H01M 8/12* (2016.01)
*H01M 8/247* (2016.01)
*H01M 8/249* (2016.01)

(52) U.S. Cl.
CPC ....... *H01M 8/0247* (2013.01); *H01M 8/0278* (2013.01); *H01M 8/0282* (2013.01); *H01M 8/04014* (2013.01); *H01M 8/12* (2013.01); *H01M 8/247* (2013.01); *H01M 8/248* (2013.01); *H01M 8/249* (2013.01); *H01M 8/2432* (2016.02); *H01M 8/2475* (2013.01); *H01M 2008/1293* (2013.01)

(56) References Cited

U.S. PATENT DOCUMENTS

| | | | |
|---|---|---|---|
| 8,985,319 B2 | 3/2015 | Chaise et al. | |
| 9,096,433 B2 | 8/2015 | Gillia et al. | |
| 9,574,278 B2 | 2/2017 | Planque | |
| 9,746,133 B2 | 8/2017 | Elie et al. | |
| 2003/0203267 A1* | 10/2003 | Chou | F16J 15/122 29/623.2 |
| 2003/0215689 A1* | 11/2003 | Keegan | H01M 8/2432 29/623.2 |
| 2010/0143759 A1* | 6/2010 | Kaupert | H01M 8/04007 429/440 |
| 2010/0190090 A1* | 7/2010 | Kuno | H01M 8/2483 429/495 |
| 2012/0045702 A1* | 2/2012 | Takahashi | H01M 8/1213 429/457 |
| 2012/0107714 A1* | 5/2012 | Day | H01M 8/12 429/457 |
| 2015/0288020 A1 | 10/2015 | Yamamoto et al. | |
| 2017/0362724 A1* | 12/2017 | Planque | H01M 8/0258 |
| 2019/0013539 A1* | 1/2019 | Reytier | C25B 11/036 |
| 2019/0245224 A1 | 8/2019 | Lacroix et al. | |
| 2019/0326621 A1 | 10/2019 | Planque et al. | |
| 2019/0372137 A1 | 12/2019 | Planque et al. | |

FOREIGN PATENT DOCUMENTS

| | | | | |
|---|---|---|---|---|
| FR | 3 045 215 A1 | 6/2017 | | |
| FR | 3045215 A1 * | 6/2017 | ............. | C25B 9/73 |
| JP | 2012-186048 A | 9/2012 | | |
| JP | 2017-111856 A | 6/2017 | | |
| WO | WO-2016096752 A1 * | 6/2016 | ........... | H01M 8/006 |

OTHER PUBLICATIONS

U.S. Pat. No. 9,096,433, Aug. 4, 2015, 2012/0222971 A1, Gillia et al.
U.S. Pat. No. 8,985,319, Mar. 24, 2015, 2012-0222972 A1, Chaise et al.
U.S. Pat. No. 8,945,356, Feb. 3, 2015, 2012/0325654 A1, Le Gallo et al.
U.S. Pat. No. 9,574,278, Feb. 21, 2017, 2014/0116874 A1, Planque.
U.S. Pat. No. 9,746,133, Aug. 29, 2017, 2015/0260342 A1, Elie et al.
U.S. Appl. No. 16/333,299, filed Aug. 8, 2019, 2019-0245224 A1, Lacroix et al.
U.S. Appl. No. 16/062,373, filed Jan. 10, 2019, 2019-0013539 A1, Reytier et al.
U.S. Appl. No. 16/473,809, filed Oct. 24, 2019, 2019-0326621 A1, Planque et al.
U.S. Appl. No. 16/475,836, filed Dec. 5, 2019, 2019-0372137 A1, Planque et al.
U.S. Appl. No. 16/757,000. filed Apr. 17, 2020, Roux et al.
U.S. Appl. No. 16/758,176, filed Apr. 22, 2020, Roux et al.
U.S. Appl. No. 16/872,469, filed May 12, 2020, Opprecht et al.
U.S. Appl. No. 16/954,888, filed Jun. 17, 2020, Bernard et al.
International Search Report and Written Opinion (with English Translation of Categories of Cited Documents) dated Mar. 27, 2019 in PCT/FR2018/053385 filed on Dec. 18, 2018, citing documents AA-AC and AO-AP therein, 12 pages.
French Preliminary Search Report dated Jul. 20, 2018 in French Application No. 1762507 filed on Dec. 19, 2017 citing documents AA and AO-AP therein, 1 page.

\* cited by examiner

__ASSEMBLY COMPRISING A SOEC/SOFC-TYPE SOLID OXIDE STACK, A CLAMPING SYSTEM, AND A HEAT EXCHANGE SYSTEM__

TECHNICAL FIELD

The present invention relates to the general field of high temperature water (HTW) electrolysis, in particular high temperature water vapour (HTWV) electrolysis, respectively designated as "High Temperature Electrolysis" (HTE) and "High Temperature Steam Electrolysis" (HTSE), carbon dioxide ($CO_2$) electrolysis, or even co-electrolysis of high temperature water (HTW) with carbon dioxide ($CO_2$).

More precisely, the invention relates to the field of high temperature solid oxide electrolysers, usually designated as "Solid Oxide Electrolyzer Cell" (SOEC).

It also relates to the field of high temperature solid oxide fuel cells, usually designated as "Solid Oxide Fuel Cells" (SOFC).

Thus, more generally, the invention is concerned with the field of SOEC/SOFC-type solid oxide stacks operating at a high temperature.

More precisely, the invention relates to an assembly comprising an SOEC/SOFC-type solid oxide stack, a clamping system for the stack and a high temperature sealed coupling system for the stack, as well as a system including such an assembly and a heating system coupled with said stack through such a coupling system.

STATE OF PRIOR ART

Within the scope of an SOEC-type high temperature solid oxide electrolyser, the aim is to transform through an electric current, within a same electrochemical device, water vapour ($H_2O$) into dihydrogen ($H_2$) and dioxygen ($O_2$), and/or still to transform carbon dioxide ($CO_2$) into carbon monoxide (CO) and dioxygen ($O_2$). Within the scope of an SOFC-type high temperature solid oxide fuel cell, the operation is the reverse to produce an electric current and heat by being supplied with dihydrogen ($H_2$) and dioxygen ($O_2$), typically with air and natural gas, that is methane ($CH_4$). For the sake of simplicity, the following description favours the operation of an SOEC-type high temperature solid oxide electrolyser making water electrolysis. However, this operation is applicable to carbon dioxide ($CO_2$) electrolysis, or even the co-electrolysis of high temperature water (HTW) with carbon dioxide ($CO_2$). Moreover, this operation is transposable to the case of an SOFC-type high temperature solid oxide fuel cell.

To make water electrolysis, it is advantageous to make it at a high temperature, typically between 600 and 1000° C., because it is more advantageous to electrolyse water vapour than liquid water and because part of the energy necessary to the reaction can be brought by heat, less expensive than electricity.

To implement high temperature water (HTW) electrolysis, an SOEC-type high temperature solid oxide electrolyser consists of a stack of elementary units each including a solid oxide electrolysis cell, or electrochemical cell, consisting of three anode/electrolyte/cathode layers superimposed on each other, and interconnection plates of metal alloys, also called bipolar plates or interconnectors. Each electrochemical cell is sandwiched between two interconnection plates. An SOEC-type high temperature solid oxide electrolyser is then an alternate stack of electrochemical cells and interconnectors. An SOFC-type high temperature solid oxide fuel cell consists of the same stack of elementary units. Since this high temperature technology is reversible, the same stack can operate in an electrolysis mode and produce hydrogen and oxygen from water and electricity, or in a fuel cell mode and produce electricity from hydrogen and oxygen.

Each electrochemical cell corresponds to an electrolyte/electrodes assembly, which is typically a ceramic multilayer assembly the electrolyte of which is formed by an ion conducting central layer, this layer being solid, dense and sealed, and sandwiched between both porous layers forming the electrodes. It is to be noted that further layers can exist, but which can only be used to improve one or more of the already described layers.

The interconnection, electrical and fluidic devices, are electronic conductors which ensure, from the electrical point of view, connection of each electrochemical cell of elementary unit in the stack of elementary units, guaranteeing electric contact between a face and the cathode of a cell and between the other face and the anode of the next cell, and from a fluidic point of view, thus combining the production of each of the cells. The interconnectors thus ensure electric current feed and collect functions and delimit gas circulation compartments, for dispensing and/or collection.

More precisely, the main function of interconnectors is to ensure electric current flow but also gas circulation in the vicinity of each cell (namely: injected water vapour, hydrogen and oxygen extracted for HTW electrolysis; air and fuel including hydrogen injected and water extracted for an SOFC cell), and separate anode and cathode compartments of two adjacent cells, which are gas circulation compartments on the anodes and cathodes sides of the cells respectively.

In particular, for an SOEC-type high temperature solid oxide electrolyser, the cathode compartment includes water vapour and hydrogen, products of the electrochemical reaction, whereas the anode compartment includes a purge gas, if present, and oxygen, another product of the electrochemical reaction. For an SOFC-type high temperature solid oxide fuel cell, the anode compartment includes fuel, whereas the cathode compartment includes oxidizer.

To make high temperature water (HTW) vapour electrolysis, water vapour ($H_2O$) is injected into the cathode compartment. Under the effect of the electric current applied to the cell, dissociation of water molecules as water vapour is made at the interface between the hydrogen electrode (cathode) and the electrolyte: this dissociation produces dihydrogen gas ($H_2$) and oxygen ions ($O^{2-}$). Dihydrogen ($H_2$) is collected and discharged from the hydrogen compartment. The oxygen ions ($O^{2-}$) migrate through the electrolyte and are recombined as dioxygen ($O_2$) at the interface between electrolyte and oxygen electrode (anode). A purge gas, such as air, can circulate at the anode and thus collect oxygen generated in gas form at the anode.

To ensure the operation of a solid oxide fuel cell (SOFC), air (oxygen) is injected into the cathode compartment of the cell and hydrogen is injected into the anodic compartment. Oxygen from air will be dissociated into ions $O^{2-}$. These ions will migrate in the electrolyte of the cathode to the anode to oxide hydrogen and form water with a simultaneous production of electricity. In an SOFC cell, as well as in SOEC electrolysis, water vapour is located in the dihydrogen ($H_2$) compartment. Only the polarity is reversed.

Figure 1:
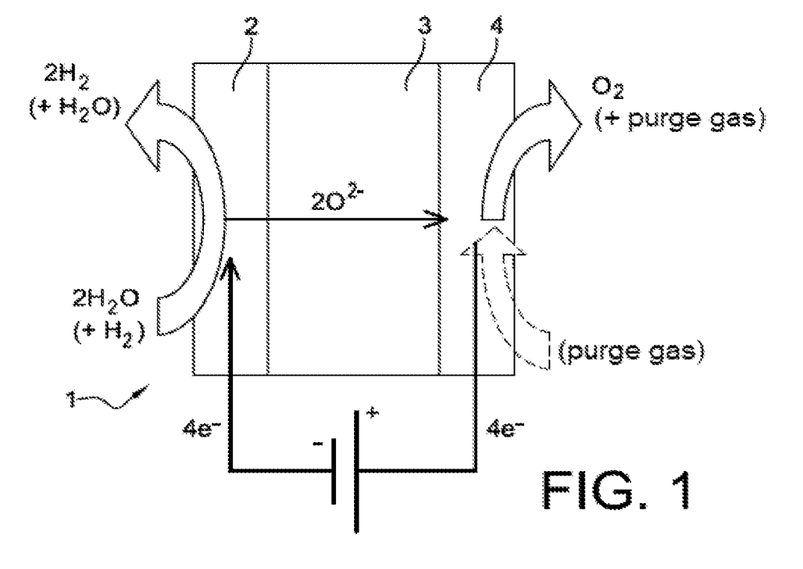
FIG. 1 is a schematic view showing the theory of operation of a high temperature solid oxide electrolyser (SOEC)

By way of illustration, FIG. 1 represents a schematic view showing the theory of operation of an SOEC-type high temperature solid oxide electrolyser. The function of such an electrolyser is to transform water vapour into hydrogen and oxygen according to the following electrochemical reaction:

$$2H_2O \rightarrow 2H_2 + O_2.$$

This reaction is made electrochemically in electrolyser cells. As depicted in FIG. 1, each elementary electrolysis cell 1 is formed by a cathode 2 and an anode 4, placed on either side of a solid electrolyte 3. Both electrodes (cathode and anode) 2 and 4 are electron and/or ion conductors, made of porous material, and the electrolyte 3 is gas tight, electron insulating and ion conducting. The electrolyte 3 can be in particular an anion conductor, more precisely an anion conductor of ions $O^{2-}$ and the electrolyser is hence called an anion electrolyser, as opposed to proton electrolytes ($H^+$).

Electrochemical reactions occur at the interface between each of electronic conductors and the ion conductor.

At the cathode 2, the half-reaction is the following one:

$$2H_2O + 4e^- \rightarrow 2H_2 + 2O^{2-}.$$

At the anode 4, the half-reaction is the following one:

$$2O^{2-} \rightarrow O_2 + 4e^-.$$

The electrolyte 3, interposed between both electrodes 2 and 4, is the migration place for ions $O^{2-}$ under the effect of the electric field created by the potential difference imposed between the anode 4 and cathode 2.

As illustrated in brackets in FIG. 1, water vapour input to the cathode can be accompanied with hydrogen H2 and the hydrogen produced and recovered as an output can be accompanied with water vapour. Likewise, as illustrated by the dotted line, a purge gas, such as air, can further be injected as an input to discharge oxygen produced. The further function of purge gas injection is to play the role of a heat regulator.

An elementary electrolyser, or electrolysis reactor, consists of an elementary cell as described above, with a cathode 2, an electrolyte 3, and an anode 4, and two interconnectors which ensure electric, hydraulic and thermal dispense functions.

To increase flow rates of hydrogen and oxygen produced, it is known to stack several elementary electrolysis cells on each other by separating them with interconnectors. The whole is positioned between two end interconnection plates which support electric supplies and gas supplies for the electrolyser (electrolysis reactor).

An SOEC-type high temperature solid oxide electrolyser thus comprises at least one, generally a plurality of, electrolysis cells stacked on each other, each elementary cell being formed by an electrolyte, a cathode and an anode, the electrolyte being interposed between the anode and cathode.

As previously indicated, the fluidic and electric interconnection devices which are in electric contact with one or more electrodes generally ensure electric current feed and collect functions and delimit one or more gas circulation compartments.

Thus, the function of the so-called cathode compartment is to dispense electric current and water vapour as well as to recover hydrogen at the cathode in contact.

The function of the so-called anode compartment is to dispense electric current as well as recover oxygen produced at the anode in contact, possibly using a purge gas.

Figure 2:
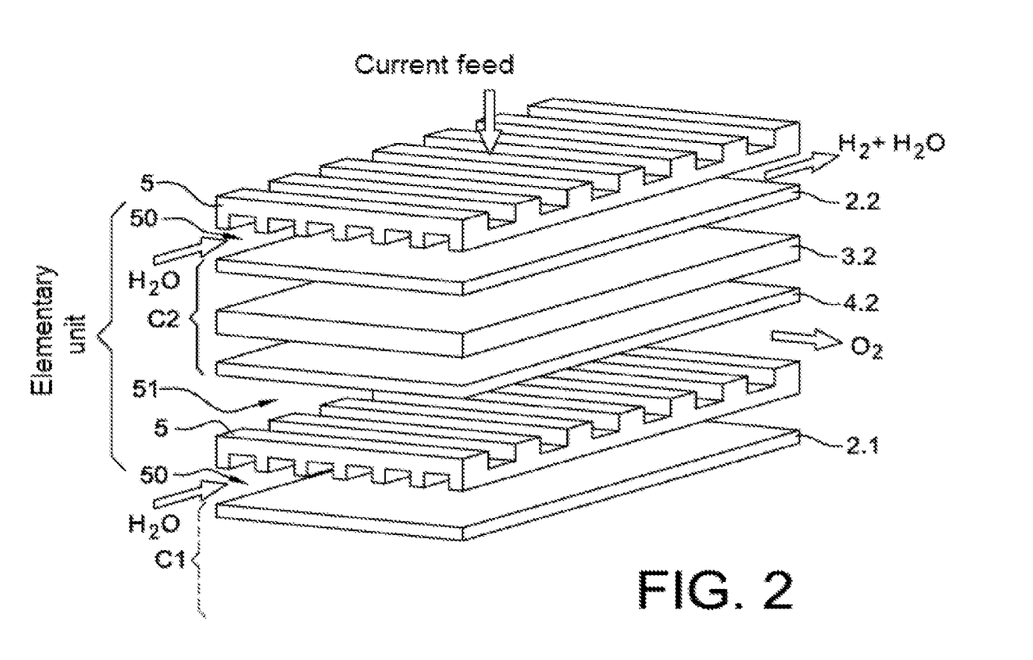
FIG. 2 is an exploded schematic view of part of a high temperature solid oxide electrolyser (SOEC) comprising interconnectors according to prior art.

FIG. 2 represents an exploded view of elementary units of an SOEC-type high temperature solid oxide electrolyser according to prior art. This electrolyser includes a plurality of elementary electrolysis cells C1, C2, of the solid oxide (SOEC) type, alternately stacked with interconnectors 5. Each cell C1, C2 consists of a cathode 2.1, 2.2 and an anode (only the anode 4.2 of the cell C2 is represented), between which an electrolyte (only the electrolyte 3.2 of the cell C2 is represented) is disposed.

The interconnector 5 is a component of metal alloy which ensures separation between cathode 50 and anode 51 compartments, defined by volumes included between the interconnector 5 and the adjacent cathode 2.1 and between the interconnector 5 and the adjacent anode 4.2 respectively. It also ensures the dispensing of gases to the cells. Injection of water vapour into each elementary unit is made in the cathode compartment 50. Collecting the hydrogen produced and residual water vapour at the cathode 2.1, 2.2 is made in the cathode compartment 50 downstream of the cell C1, C2 after dissociating water vapour by the same. Collecting oxygen produced at the anode 4.2 is made in the anode compartment 51 downstream of the cell C1, C2 after dissociating water vapour by the same. The interconnector 5 ensures current flow between the cells C1 and C2 by direct contact with the adjacent electrodes, that is, between the anode 4.2 and cathode 2.1.

Since the operating conditions of a high temperature solid oxide electrolyser (SOEC) are very close to those of a solid oxide fuel cell (SOFC), there are the same technological restrictions.

Thus, a proper operation of such SOEC/SOFC-type solid oxide stacks operating at high temperature mainly requires to meet the requirements set out hereinafter.

First, it is necessary to have electric insulation between two successive interconnectors, otherwise the electrochemical cell would be short-circuited, but also a proper electric contact and a sufficient contact surface area between a cell and an interconnector. An ohmic resistance as low as possible is targeted between cells and interconnectors.

Additionally, sealing should be provided between the anode and cathode compartments, otherwise there would be a recombination of the gases produced leading to a decrease in the efficiency and mainly the occurrence of hot spots damaging the stack.

Finally, it is essential to have a proper gas dispense both as input and recovery of the products, otherwise there would be efficiency loss, pressure and temperature inhomogeneity within the different elementary units, or even unacceptable degradations of the electrochemical cells.

The incoming and outgoing gases in a high temperature electrolysis (SOEC) or fuel cell (SOFC) stack operating at a high temperature can be managed through appropriate devices of a furnace as that illustrated with reference to FIG. 3.

The furnace 10 thus includes cold parts PF and hot parts PC, the latter comprising the furnace bottom 11, a loop tube 12 to manage gas inlets and outlets and the stack 20, for high temperature electrolysis (SOEC) or fuel cell (SOFC).

The couplings of the gas feed and outlet devices are most often made at the cold parts PF, in particular through double-ring mechanical clamping connectors, VCR® metal seal surface sealing connectors, welded joints or even sealed bushings of partitions.

In the case of double-ring mechanical clamping connections, both rings separate tube sealing and clamping functions. The front ring creates sealing whereas the rear ring enables the front ring to be axially advanced and radially applies tube actual clamping. This principle enables a very good tube clamping and very good gas leak sealing to be achieved. Moreover, its installation is easy and it has a very good resistance to fatigue caused by vibrations. The detachment is ready in case of no welding. However, its major drawbacks are precisely its absence of high temperature resistance such that the rear ring, the front ring and the tube can be welded together by diffusion welding making the junction undetachable.

In the case of metal seal surface sealing connections VCR®, sealing is achieved when the seal is compressed by two flanges upon clamping a male nut or a hex head body with a female nut. This principle allows a very good sealing, the possibility of using different seals (nickel, copper, stainless steel, . . . ) depending on the most appropriate configuration, and an easy attachment/detachment with seal change during these operations. However, this solution is not suitable at a high temperature, its operation allowing a maximum temperature of only about 537° C.

In the case of welded joints, a total sealing is achieved by welding the tubes together by a TIG (Tungsten Inert Gas) type method or by an orbital welder, that is a TIG method coupled with a rotary nozzle. However, welding operations on a stack 20 mounted in a furnace 10 are very complicated due to the reduced accessibility to be able to weld tubes to the perimeter.

Finally, there is a coupling system resistant to a temperature of about 870° C., using sealed bushings of partitions for passing sensors, probes, electrical signals and tubes. These sealed bushings of partitions are in the form of a stainless steel 316L threaded connector which is to be screwed to the wall of a piping, a vessel or a cover. Depending on their version, these bushings accommodate one or more through elements, with different types, sizes and diameters. These bushings thus enable elements to pass therethrough without discontinuity and do not allow a sealed junction of both elements.

Couplings of gas feed and outlet devices at the cold parts PF of the furnace 10 are a major drawback because these cold parts PF are far from the resistances of the furnace 10 and hindered by peripherals such as exchangers, insulators, condensers, among other things. This implies that priority should be given to making joints in hot parts PC with the desire to make them easily detachable and reusable.

Moreover, the use of the enclosure of the furnace 10 to preheat the inlet gases also causes to make the loop tube 12, with a length from about 2.5 to 3 m, to use radiation of heating resistances of the furnace 10, which adds complexity in bending processes to ensure that the tubes arrive at the right place in a confined space.

Further, if it is desired to be able to detach the stack 20 to be able to operate it at another location, thereby providing it with a "Plug & Play" (PnP) type character, the joints should first be mechanically broken, for example using a hacksaw, and new joints should be prepared to put the stack 20 on another furnace, which greatly complicates handling operations.

Finally, it is to be noted that such a stack 20 is very brittle and it is necessary to make as few operations as possible when changing location. Thus, vibrations and shocks should specially be avoided and it should also be avoided to turn it over.

Previously discussed coupling solutions do not enable needs set out above to be met. In particular, double-ring mechanical clamping connectors are welded at a high temperature. The welds do not address the problem discussed due to the welding complexity (difficult access) and they do not avoid cutting the tubes for detachment.

Coupling solutions of prior art do not enable the stack 20 to be removed from a furnace 10 to reconnect it to another furnace 10, that is they do not enable a "Plug & Play" character, without mechanically breaking the junctions, which forces operators in charge of attachment/detachment to make tedious bending, coupling and adaptation work.

DISCLOSURE OF THE INVENTION

The purpose of the invention is to at least partially overcome previously mentioned needs and drawbacks relating to embodiments of prior art.

Specially, it is directed to the performance of a particular design of the coupling of a high temperature electrolysis (SOEC) or fuel cell (SOFC) stack, especially for a stack having a "Plug & Play" (PnP) type character (self-clamping system), as described in French patent application FR 3 045 215 A1.

Thus, one object of the invention, according to one of its aspects, is an assembly, including:
 an SOEC/SOFC-type solid oxide stack operating at a high temperature, including:
 a plurality of electrochemical cells each formed by a cathode, an anode and an electrolyte interposed between the cathode and the anode, and a plurality of intermediate interconnectors each arranged between two adjacent electrochemical cells,
 a clamping system for the SOEC/SOFC-type solid oxide stack, including an upper clamping plate and a lower clamping plate, between which an SOEC/SOFC-type solid oxide stack is sandwiched, each clamping plate including at least two clamping holes, the clamping system further including:
 at least two clamping rods each for extending through a clamping hole of the upper clamping plate and through a corresponding clamping hole of the lower clamping plate for assembling the upper and lower clamping plates therebetween,
 clamping means at each clamping hole of the upper and lower clamping plates for cooperating with said at least two clamping rods for assembling the upper and lower clamping plates therebetween,
 a high temperature sealed coupling system for coupling said SOEC/SOFC-type solid oxide stack to a heating system, specially a furnace, for gas feed and outlet, the coupling system being advantageously detachable and advantageously enabling said SOEC/SOFC-type solid oxide stack to be electrically insulated,
 characterised in that the coupling system includes:
 a collector, or manifold, comprising at least two collecting ducts for gas feed and outlet each provided with a collecting hole positioned facing a corresponding communication hole of at least one of the upper and lower clamping plates,
 at least two seals (35) each placed between a collecting hole (33) and a corresponding communication hole (34).

The assembly according to the invention can further include one or more of the following characteristics taken alone or according to any technically possible combinations.

Advantageously, the communication holes can belong to the lower clamping plate of the clamping system. Thus, the invention can advantageously use the lower clamping plate of this clamping system to allow quick installation of the stack on the collector within the system and in the meantime sealed and detachable fluid connection mating.

Additionally, advantageously, the seals enable sealing to be ensured between the stack, equipped with its autonomous clamping system and the collector. The seals can in particular have a toric shape.

The coupling system is advantageously detachable, and can thus be reused after thermal cycling, only the seals being possibly replaced at each detachment/reattachment.

The coupling system advantageously allows electric insulation of said SOEC/SOFC-type solid oxide stack with respect to the rest of the assembly, in particular the heating system, which is not possible with the conventional solutions of prior art of the double-ring metal connector or VCR® type.

The SOEC/SOFC-type solid oxide stack can include an upper end plate and a lower end plate, between which the plurality of electrochemical cells and the plurality of intermediate interconnectors are sandwiched.

Preferentially, said at least two seals can be made of mica. The use of a mica seal has multiple advantages as detailed hereinafter. First, it enables sealing of gas feed and outlet couplings between the stack and the heating system, such as a furnace, to be ensured, on a temperature range from 0° C. to 900° C. The geometry of the seal can be optimised in order to ensure compression stress in mica which is sufficient to ensure robust sealing. This stress depends on the mica thickness. Thus, for example, for a mica seal of about 0.25 mm thick, the compression stress applied can be at least 13 MPa.

Additionally, the mica seal enables the stack to be electrically insulated with respect to the heating system.

Further, the mica seal allows repeated detachability/reattachability of the coupling by avoiding welding of high temperature metal planar parts, as well as several thermal cyclings.

The thickness of said at least two mica seals can preferentially be lower than or equal to 0.3 mm. Such a thickness value of the mica seals can enable both cold and hot sealing to be achieved.

Alternatively, said at least two seals can be made of metal.

For example, said at least two seals can be bi-delta type O-ring seals, having a substantially rectangle shaped cross-section the two opposite longer sides of which each include a substantially triangular-shaped projecting annular portion, both projecting portions being superimposed on each other.

Said at least two seals can further be C-ring type seals, having a C-shaped cross-section.

Additionally, the collecting holes of said at least two collecting ducts of the collector can be positioned facing corresponding communication holes of the lower clamping plate such that the stress applied to said at least two seals for coupling sealing is only exerted by the weight of the stack equipped with the clamping system.

Further, the collector can include at least one securing through hole through which a clamping rod of the clamping system can completely pass. Moreover, the coupling system can include a securing means for securing the collector to said at least one of the upper and lower clamping plates cooperating with the portion of the clamping rod having passed through said at least one securing hole.

The clamping rod can advantageously be threaded. Moreover, the securing means can be a securing nut. The threaded clamping rod and/or the securing nut can be coated with a high temperature anti-seize paste.

Additionally, said at least two collecting ducts of the collector can be each coupled with said at least one of the upper and lower clamping plates through a sealed detachable connector.

The detachable sealed connector can be formed by a high temperature sealed coupling system, including:
- a hollow base at least partially threaded on its external surface called a threaded base, made integral with said at least one of the upper and lower clamping plates and secured to an inner communication duct of the stack, the threaded base including a communication hole,
- a hollow base having an at least partially smooth external surface, called a smooth base made integral with the collector and secured to a collecting duct of the collector, the smooth base including a collecting hole, the smooth base and the threaded base being positioned facing each other for being fluidly communicated with each other,
- a threaded nut, able to cooperate with the threaded base to form a screw/nut system and able to slide with respect to the smooth base, the threaded nut including, on its internal surface, a first threaded portion cooperating with the thread of the threaded base and a second smooth portion in slidable contact with the smooth external surface of the smooth base.

Additionally, the smooth base, the threaded nut and the threaded base can be made of a nickel-based superalloy, in particular of the Inconel 600, and/or austenitic stainless steel, in particular stainless steel 316L type.

Further, another object of the invention, according to another of its aspects, is a system, characterised in that it includes:
- an assembly as previously defined,
- a heating system, specially an oven, coupled with said SOEC/SOFC-type solid oxide stack of the assembly through the coupling system of the assembly for gas feed and outlet.

The assembly and system according to the invention can include any of the characteristics set forth in the description, taken alone or according to any technically possible combinations with other characteristics.

BRIEF DESCRIPTION OF THE DRAWINGS

The invention will be better understood upon reading the detailed description that follows, of non-limiting exemplary implementations thereof, as well as upon examining schematic and partial figures of the appended drawing, in which.

Throughout these figures, identical references can designate identical or analogous elements.

Moreover, the different parts represented in the figures are not necessarily drawn to uniform scale, to make the figures more legible.

DETAILED DISCLOSURE OF PARTICULAR EMBODIMENTS

Figure 3:
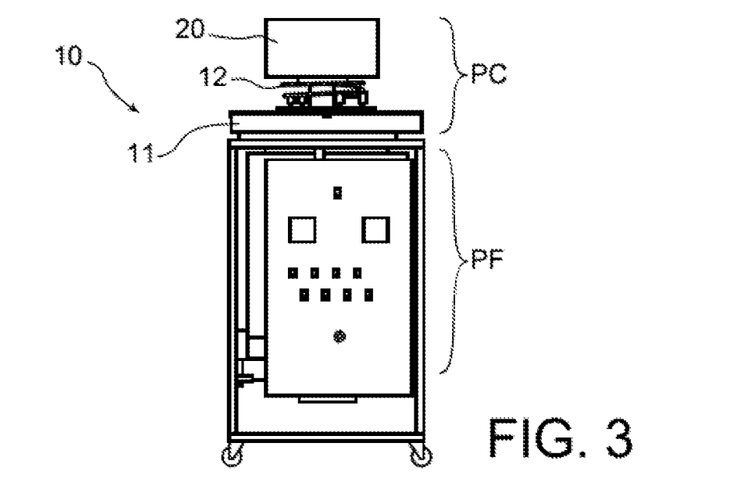
FIG. 3 illustrates the principle of the architecture of a furnace on which a high temperature electrolysis (SOEC) or fuel cell (SOFC) stack operating at a high temperature is placed.

FIGS. 1 to 3 have already been previously described in the part relating to the state of prior art and technical background of the invention. It is set forth that, for FIGS. 1 and 2, symbols and arrows for supply of water vapour $H_2O$, dispense and recovery of dihydrogen $H_2$, oxygen $O_2$, air and electric current, are shown for the sake of clarity and accuracy, to illustrate the operation of the devices represented.

Further, it should be noted that all the components (anode/electrolyte/cathode) of a given electrochemical cell are preferentially ceramics. The operating temperature of a high temperature SOEC/SOFC-type stack is additionally typically between 600 and 1000° C.

Moreover, the optional terms "upper" and "lower" have to be understood here along the normal orientation direction of an SOEC/SOFC-type stack.

Figure 4:
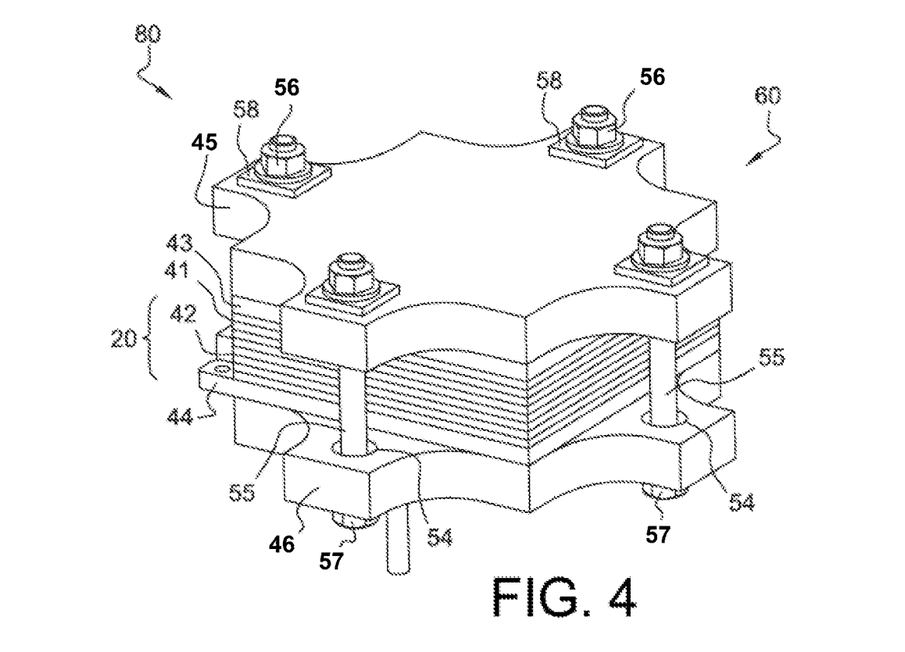
FIG. 4 represents, in a perspective view, an example of an SOEC/SOFC-type solid oxide stack with its clamping system for an assembly in accordance with the invention.

With reference to FIG. 4, an exemplary assembly 80 has been illustrated, comprising an SOEC/SOFC-type solid oxide stack 20 and a clamping system 60, wherein this assembly 80 can be integrated into an assembly 100 in accordance with the invention, as described in the following with reference to FIGS. 5A-5C, 6A-6C and 7A-7C.

Advantageously, the assembly 80 has a structure similar to that of the assembly described in French patent application FR 3 045 215 A1, that is the stack 20 has a "Plug & Play" (PnP) type character.

Also, in a common way to the different embodiments of the invention described hereafter, and as is visible in FIG. 4, the assembly 80 includes an SOEC/SOFC-type solid oxide stack 20 operating at a high temperature.

This stack 20 includes a plurality of electrochemical cells 41 each formed by a cathode, an anode and an electrolyte interposed between the cathode and anode, and a plurality of intermediate interconnectors 42 each arranged between two adjacent electrochemical cells 41. This assembly of electrochemical cells 41 and intermediate interconnectors 42 can also be designated as a "stack".

Moreover, the stack 20 includes an upper end plate 43 and a lower end plate 44, also called an upper stack end plate 43 and a lower stack end plate 44 respectively, between which the plurality of electrochemical cells 41 and the plurality of intermediate interconnectors 42 are sandwiched, that is between which the stack is.

Additionally, the assembly 80 also includes a clamping system 60 for the SOEC/SOFC-type solid oxide stack 20, including an upper clamping plate 45 and a lower clamping plate 46, between which the SOEC/SOFC-type solid oxide stack 20 is sandwiched.

Each clamping plate 45, 46 of the clamping system 60 includes four clamping holes 54.

Moreover, the clamping system 60 further includes four clamping rods 55, or tie rods, extending through a clamping hole 54 of the upper clamping plate 45 and through a corresponding clamping hole 54 of the lower clamping plate 46 to allow for assembling the upper 45 and lower 46 clamping plates to each other.

The clamping system 60 further includes clamping means 56, 57, 58 at each clamping hole 54 of the upper 45 and lower 46 clamping plates cooperating with the clamping rods 55 for assembling the upper 45 and lower 46 clamping plates to each other.

More precisely, the clamping means include, at each clamping hole 54 of the upper clamping plate 45, a first clamping nut 56 associated with a clamping washer 58 these cooperating with the corresponding clamping rod 55 inserted through the clamping hole 54. Moreover, the clamping means include, at each clamping hole 54 of the lower clamping plate 46, a second clamping nut 57 cooperating with the corresponding clamping rod 55 inserted through the clamping hole 54. The clamping washer 58 is located between the first clamping nut 56 and the upper clamping plate 45.

The assembly 100 in accordance with the invention additionally includes a high temperature sealed coupling system 30 for the stack 20 for gas feed and outlet between the stack 20 and the heating system, in particular a furnace 10 as previously described. FIGS. 5A to 7C enable different possibilities for the coupling system 30 to be described.

Thus, in accordance with the invention, and in a common way to all the embodiments of the invention, the high temperature sealed coupling system 30 for the stack 20 includes a collector 31, or also called manifold. This collector 31 comprises four collecting ducts 32 for gas feed and outlet. Each collecting duct 32 includes a collecting hole 33 opening into the surface of the collector 31 facing the lower clamping plate 46.

Figure 5A:
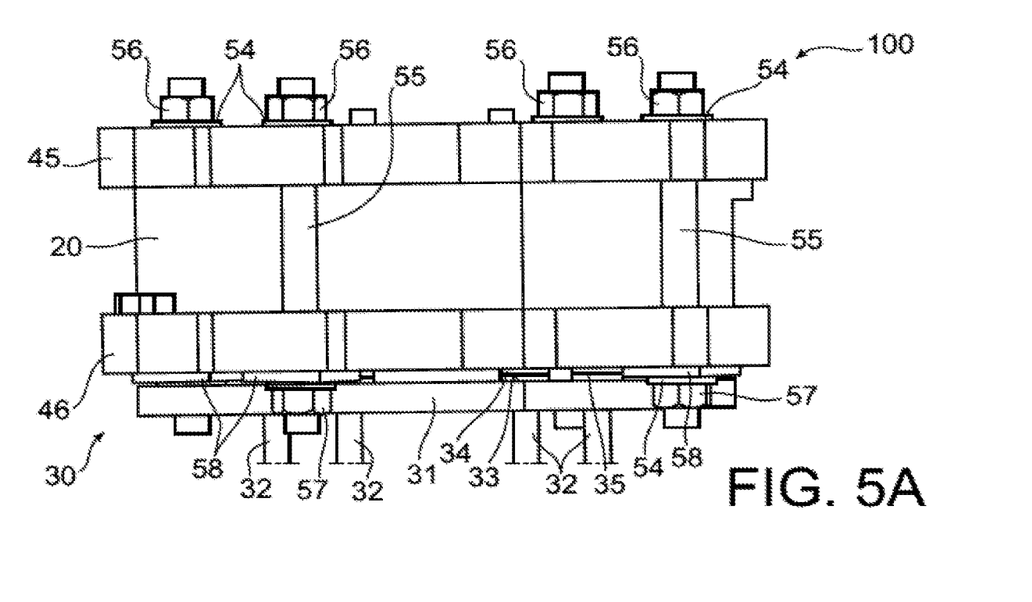
FIGS. 5A, 5B and 5C represent, in a side assembled view, a partial cross-section view and an exploded perspective view, respectively, a first exemplary embodiment of an assembly in accordance with the invention.
Figure 5B:
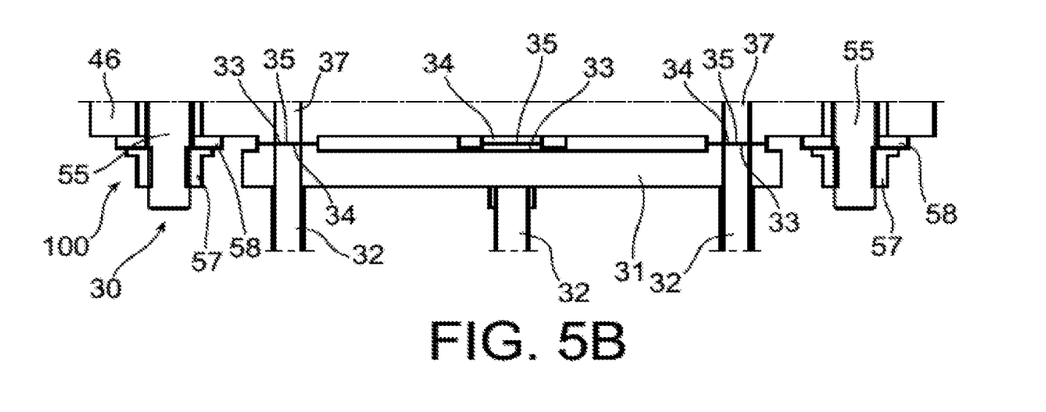
Figure 6A:
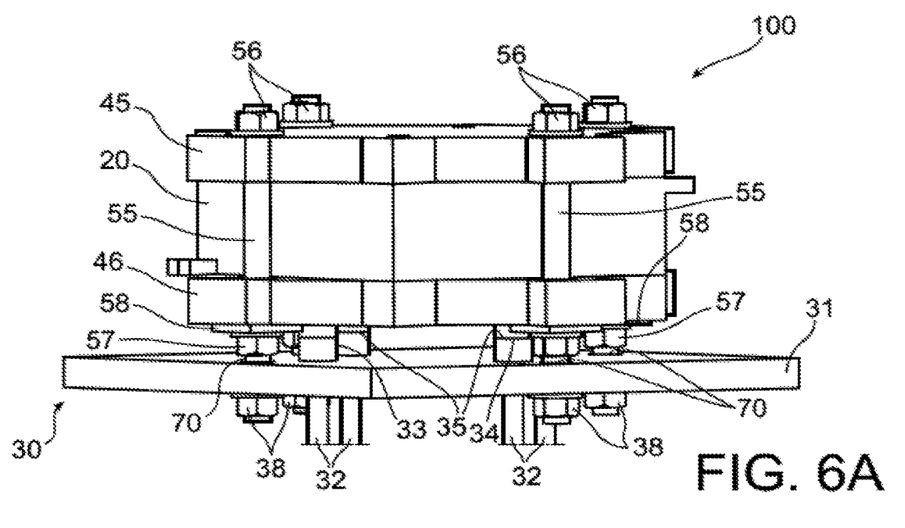
FIGS. 6A, 6B and 6C represent, in a side assembled view, a partial cross-section view and an exploded perspective view, respectively, a second exemplary embodiment of an assembly in accordance with the invention.
Figure 6B:
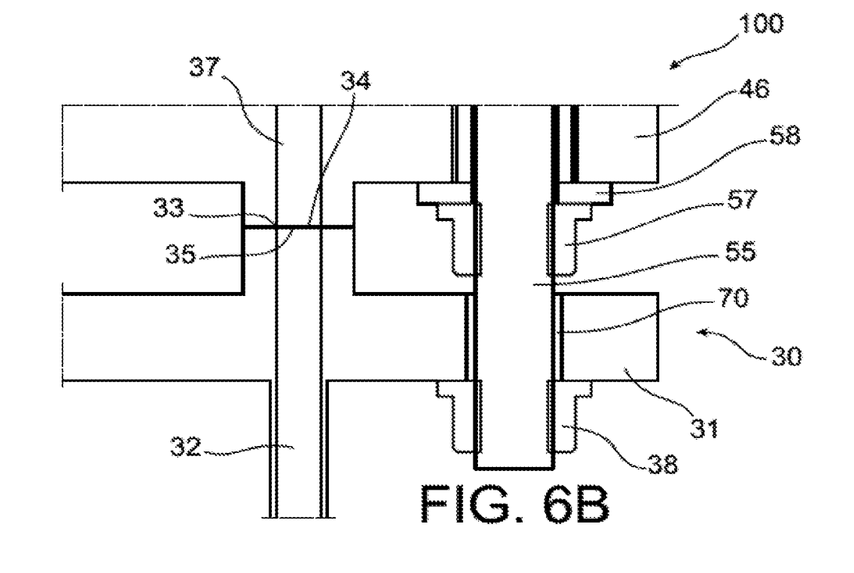
Figure 7A:
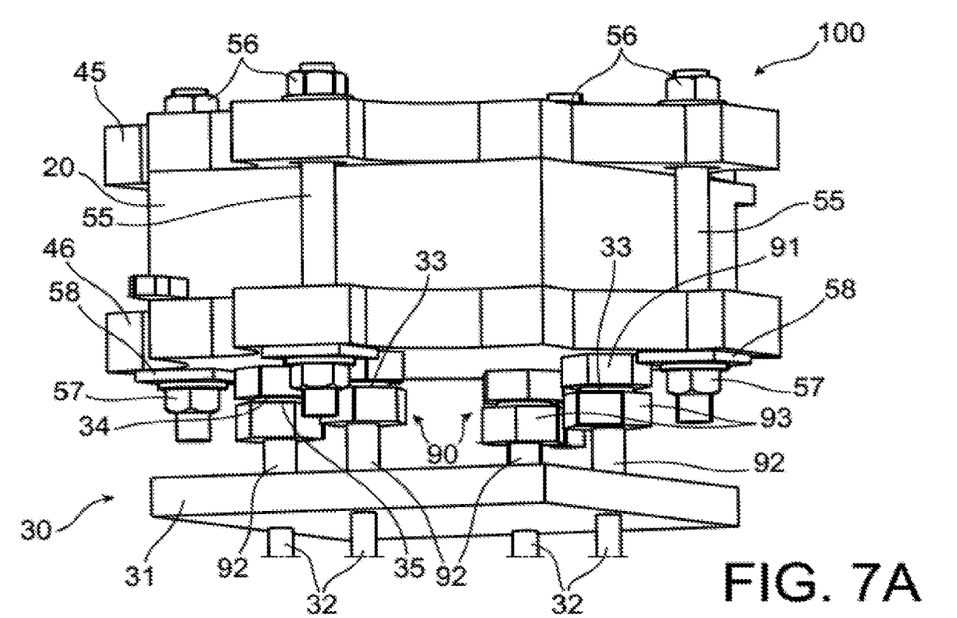
FIGS. 7A, 7B and 7C represent, in a side assembled view, a partial cross-section view and an exploded perspective view, respectively, a third exemplary embodiment of an assembly in accordance with the invention.
Figure 7B:
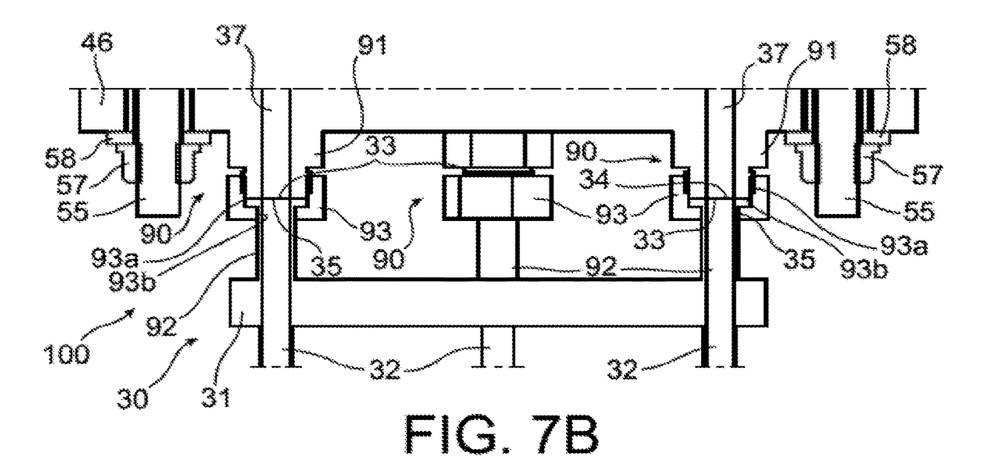

Additionally, the lower clamping plate 46 of the autonomous clamping system 60 of the stack 20 includes communication holes 34 of internal communication ducts 37 of the stack 20, as visible for example in FIGS. 5B, 6B and 7B.

Advantageously, the collecting holes 33 are positioned facing the communication holes 34 so as to allow fluidic coupling between the stack 20 and the collector 31 for gas feed and outlet.

Further, the seals 35 are advantageously placed between each collecting hole 33 and its corresponding communication hole 34 in order to guarantee coupling sealing.

Figure 5C:
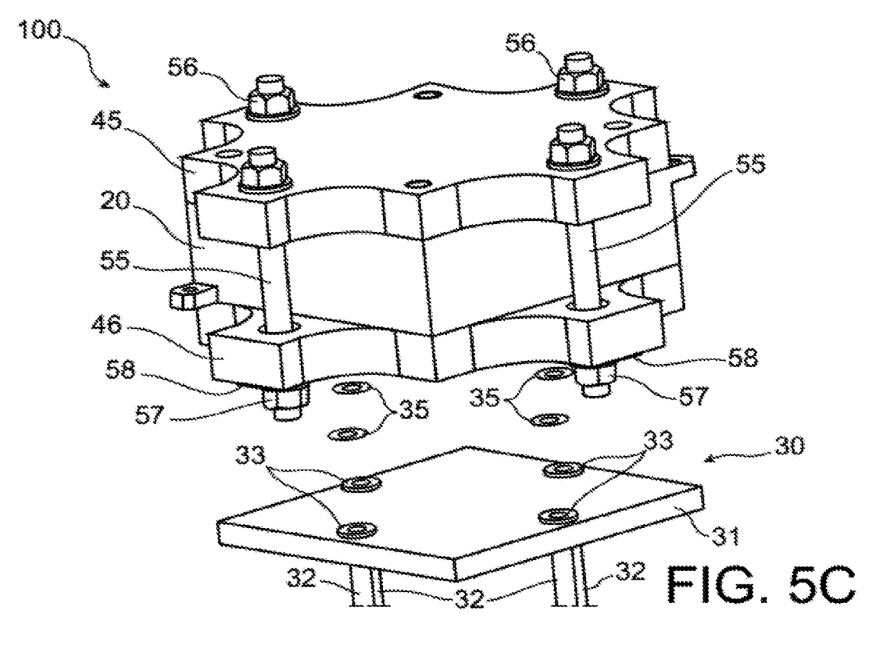

FIGS. 5A, 5B and 5C represent in a side assembled view, a partial cross-section view and an exploded perspective view, respectively, a first exemplary embodiment of an assembly 100 in accordance with the invention.

In this first example, the collecting holes 33 of the collecting ducts 32 of the collector 31 are positioned facing the corresponding communication holes 34 of the lower clamping plate 46 such that the stress applied to the seals 35 for coupling sealing is only exerted by the weight of the stack 20 equipped with its autonomous clamping system 60.

In other words, only the weight of the stack 20 and its autonomous clamping system 60 is used to guarantee sealing at the seals 35.

Advantageously, it is thus possible to remove and place the stack 20 in the system easily, specially by only changing the seals 35, specially mica seals which are then consumables, and thus ensuring sealing between the stack 20 and the system which is satisfactory.

In this first exemplary embodiment, only the own weight of the stack 20 equipped with its autonomous clamping system 60 is used to ensure sealing of the gas feed and outlet couplings between the stack 20 and the furnace 10, that is the application of a determined stress as a function of thickness of the material of the seals 35, specially of mica, their contact surface area and the weight of the stack 20 equipped with the clamping system 60.

However, in the case where the own weight of the stack 20 is not sufficient to apply the necessary stress to the seals 35 to ensure a satisfactory sealing at a high temperature, that is specially a measured leakage lower than $2.10^{-5}$ $Pa·m^3·s^{-1}$, then an alternative coupling can be provided as according to the embodiments described in the following.

Figure 6C:
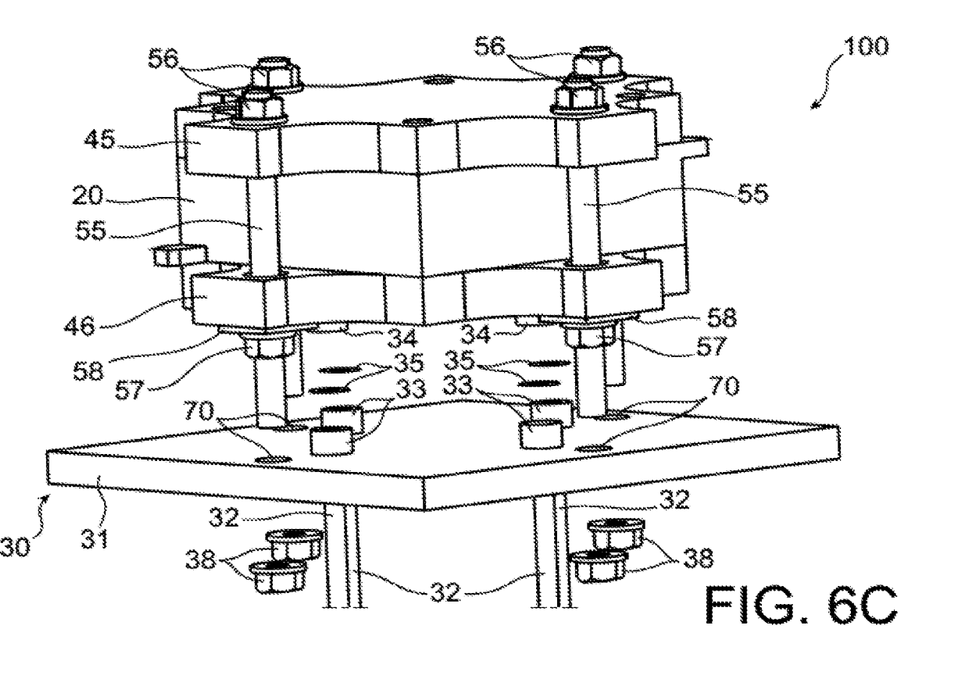

Thus, FIGS. 6A, 6B and 6C represent in a side assembled view, a partial cross-section view and an exploded perspective view, respectively, a second exemplary embodiment of an assembly 100 in accordance with the invention.

In this second embodiment, the tie rods or clamping rods 55 of the autonomous clamping system 60 are used profitably to allow coupling, being specially threaded in their entirety. Therefore, they can be used to exert a further load on the seals 35, controlled through a determined clamping torque on securing nuts 38.

More precisely, as is better visible in FIG. 6C, the collector 31 includes four securing through holes 70 in which the four clamping rods 55 of the clamping system 60 are inserted.

Moreover, four securing nuts 38 are used to be screwed on the four clamping rods 55 in order to assemble the collector 31 on the lower clamping plate 46.

Advantageously, electric insulation elements (not represented), such as mica or ceramic elements, can be inserted between the securing nuts 38 recovering the load on the clamping rods 55, the clamping rods 55 and the collector 31 so as to be able to keep electric insulation of the stack 20 with respect to the system.

Also advantageously, the thread of the clamping rods 55 and/or of the securing nuts 38 can be coated, before placing and clamping the collector 31 to the clamping rods 55, with a high temperature anti-seize paste which can make detachment easier and which can avoid a diffusion welding of the threads.

This anti-seize paste can be such that a corrosion resistant high temperature assembling lubricating anti-seize paste, making it possible to avoid blocking excess and wear of parts exposed to extreme temperatures or aggressive atmosphere such as: threads of heat engines, manifolds for hot gases, burners, valves, disk brakes, spark plugs, exhaust fasteners, rollers, bolts, collars, among other things. It can have a formulation based on copper, aluminium and graphite so as to protect metal parts and ensure detachment thereof. It can be for example the green grease marketed by Pyrox Thermique Matériaux consisting of a mixture of 50% chromium powder 3 and copper grease for mechanical parts which is marketed by Würth Company.

Figure 7C:
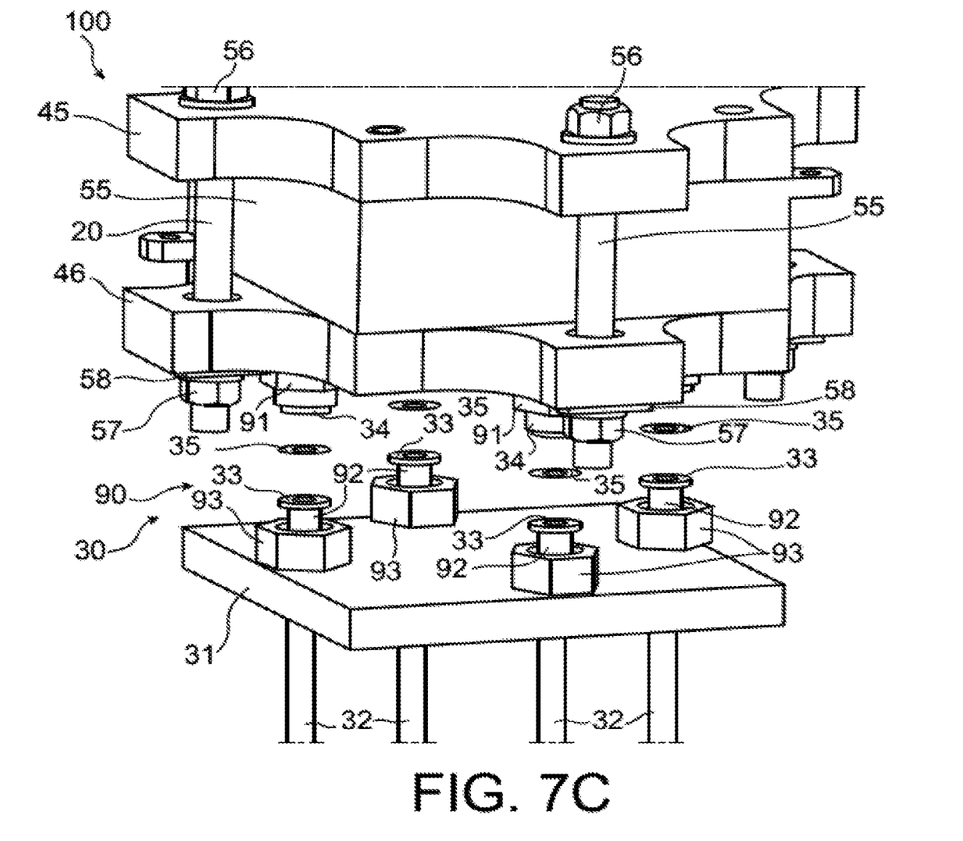

Further, FIGS. 7A, 7B and 7C represent in a side assembled view, a partial cross-section view and an exploded perspective view, respectively, a third exemplary embodiment of an assembly 100 in accordance with the invention.

In this third example, the four collecting ducts 32 of the collector 31 are coupled to the lower clamping plate 46 of the clamping system 60 through detachable sealed connectors 90. Such connectors are in particular as described in the French patent application n° 17 50009.

More precisely, each sealed detachable connector 90 is formed by a high temperature sealed coupling system. This system first includes a hollow base 91 partially threaded on its external surface called a threaded base, which is made integral with the lower clamping plate 46 and secured to an internal communication duct 37 of the stack 20. Moreover, the threaded base 91 includes a communication hole 34 as previously described.

Further, the system also includes a hollow base 92 with a smooth external surface called a smooth base, which is made integral with the collector 31 and secured to a collecting duct 32 of the collector 31. Moreover, the smooth base 92 includes a collecting hole 33 as previously described.

Thus, the smooth base 92 and the threaded base 91 are positioned facing each other to be fluidly communicated with each other.

Finally, the system includes a threaded nut 93, able to cooperate with the threaded base 91 to form a screw/nut system and able to slide with respect to the smooth base 92. As is visible in FIG. 7B, this threaded nut 93 comprises, on its internal surface, a first threaded portion 93a cooperating with the thread of the threaded base 91 and a second smooth portion 93b in slidable contact with the smooth external surface of the smooth base 92.

Advantageously, the smooth base 92, the threaded nut 93 and the threaded base 91 can be made of nickel-based super alloy, in particular of the Inconel 600 type, and/or of austenitic stainless steel, in particular of the stainless steel 316L type.

The threaded base 91 can be fastened by being welded or machined in the lower clamping plate 46 of the clamping system 60 when manufactured such that it can be part of the assembly 80 comprising the stack 20 and the clamping system 60.

The threaded nut 93 can in turn be advantageously integral with the collector 31 and can be the bearing plane for the stack 20 through the smooth base 92. The threaded nut 93 is slidably mounted on the smooth base 92 with play.

The smooth base 92 can in turn be fastened by being welded to the collector 31.

Therefore, it is possible to obtain a plane/plane type contact between the smooth base 92 of the collector 31 and the threaded base 91 of the lower clamping plate 46, a seal 35 being inserted between both bases 91 and 92 to ensure sealing of the screw/nut coupling. Thus, it is the screw/nut clamping torque which will enable the stress required for sealing to the seal 35 to be ensured.

It is also possible to insert a second seal 35, specially a second mica washer, between the threaded nut 93 and the smooth base 92 in order to guarantee electric insulation of the stack 20 if necessary.

The nominal diameter of the threaded nut 93 can be between M20 and M30. Indeed, thick threads and a significant pitch can enable diffusion welding to be avoided between the threads.

Additionally, the threaded base 91 can have a height between 15 and 30 mm, and a diameter between 20 and 30 mm.

Moreover, the smooth base 92 can have a height between 45 and 70 mm, and a maximum diameter of 30 mm.

The first threaded portion 93a of the threaded nut 93 and/or the thread of the threaded base 91 can further be covered with a high temperature resistant anti-seize agent. This anti-seize agent can be such as the anti-seize paste previously described for coating the thread of the clamping rods 55 and/or of the securing nuts 38.

In all the examples previously described, the seals 35 are preferentially made of mica.

However, it is also possible to provide seals 35 which are made of another material, and for example metal O-ring seals.

Figure 8A:
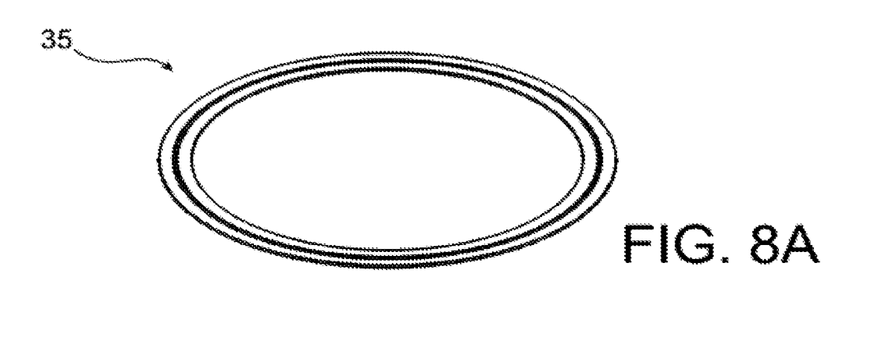
FIGS. 8A and 8B illustrate, in a perspective view and a partial cross-section view respectively, a first alternative of seal for an assembly in accordance with the invention.
Figure 8B:
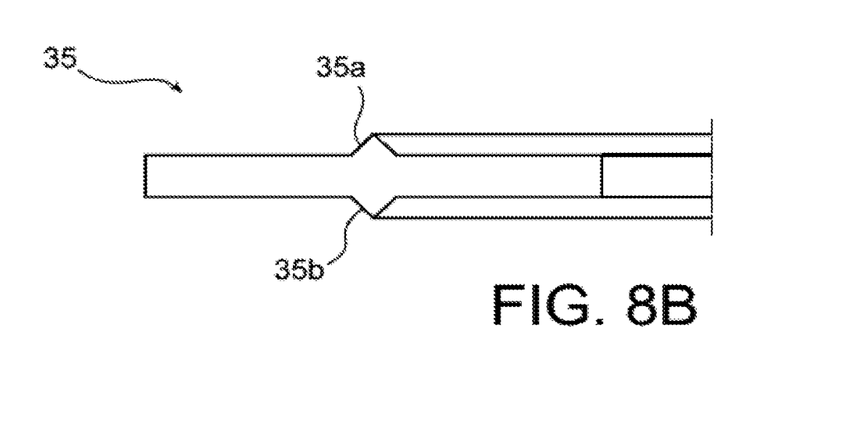

FIGS. 8A and 8B illustrate for example the possibility of having a bi-delta type O-ring seal 35. As is visible in FIG. 8B, this bi-delta type seal is characterised in that it has a substantially rectangle shaped cross-section both opposite longer sides of which each include a substantially triangular-shaped projecting annular portion 35a. Moreover, these two projecting portions 35 are superimposed on each other.

Figure 9:
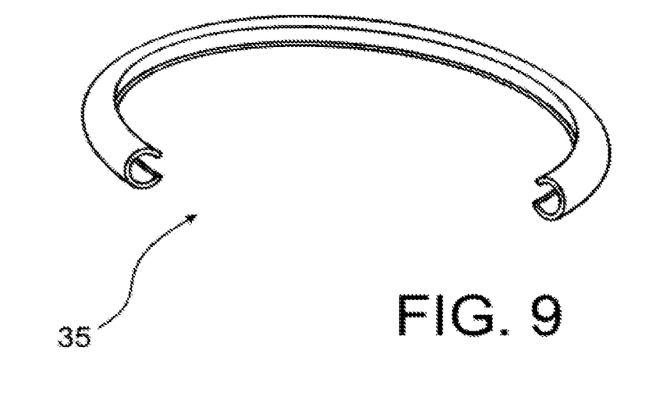
FIG. 9 illustrates, along a perspective view and partial cross-section view, a second alternative of seal for an assembly in accordance with the invention.

FIG. 9 additionally illustrates the possibility of having a O-ring seal 35 which is in the form of a C-ring type seal, that is it has a C-shaped cross-section.

Of course, the invention is not limited to the exemplary embodiments just described. Various modifications can be brought thereto by those skilled in the art.

The invention claimed is:

1. An assembly, comprising:
an SOEC/SOFC-type solid oxide stack operating at a high temperature, including a plurality of electrochemical cells each formed by a cathode, an anode and an electrolyte interposed between the cathode and the anode, and a plurality of intermediate interconnectors each arranged between two adjacent electrochemical cells;
a clamping system for the SOEC/SOFC-type solid oxide stack, including an upper clamping plate and a lower clamping plate, between which the SOEC/SOFC-type solid oxide stack is sandwiched, each clamping plate including at least two clamping holes, the clamping system further including:
at least two clamping rods each for extending through a clamping hole of the upper clamping plate and through a corresponding clamping hole of the lower clamping plate for assembling the upper and lower clamping plates to each other, and
clamping means at each clamping hole of the upper and lower clamping plates for cooperating with said at least two clamping rods for assembling the upper and lower clamping plates therebetween; and
a high temperature sealed coupling system for coupling said SOEC/SOFC-type solid oxide stack to a heating system for gas feed and outlet, the coupling system being detachable and enabling said SOEC/SOFC-type solid oxide stack to be electrically insulated, wherein
the coupling system includes:
a collector comprising at least two collecting ducts for gas feed and outlet each provided with a collecting hole positioned facing a corresponding communication hole of at least one of the upper and lower clamping plates, and
at least two seals each placed between a collecting hole and a corresponding communication hole; and
the clamping means comprises:
a first clamping nut, cooperating with a first end of one of the clamping rods inserted through a first clamping hole in the upper clamping plate, secured against an upper surface of the upper clamping plate; and
a second clamping nut cooperating with a second end of the one clamping rod inserted through a second clamping hole in the lower clamping plate,
wherein
collecting holes of said at least two collecting ducts of the collector are positioned facing corresponding communication holes of the lower clamping plate; and the lower clamping plate is detachably disposed in contact with the seals and sealed to the collector only by the weight of the stack equipped with the clamping system.

2. The assembly according to claim 1, wherein said at least two seals are made of mica.

3. The assembly according to claim 2, wherein a thickness of said at least two mica seals is lower than or equal to 0.3 mm.

4. The assembly according to claim 1, wherein said at least two seals are made of metal.

5. The assembly according to claim 4, wherein said at least two seals are bi-delta type O-ring seals, having a rectangle shaped cross-section both opposite longer sides of which each include a triangular-shaped projecting annular portion, both projecting portions being superimposed on each other.

6. The assembly according to claim 4, wherein said at least two seals are C-ring type seals, having a C-shaped cross-section.

7. The assembly according to claim 1, wherein
collecting holes of said at least two collecting ducts of the collector are positioned facing corresponding communication holes of the lower clamping plate; and
the lower clamping plate is detachably disposed in contact with the seals and sealed to the collector only by the weight of the stack equipped with the clamping system.

8. The assembly according to claim 1, wherein the collector includes at least one securing through hole through which a clamping rod of the clamping system can completely pass, and wherein the coupling system includes a securing means for securing the collector to said at least one of the upper and lower clamping plates cooperating with a portion of the clamping rod having passed through said at least one securing hole.

9. The assembly according to claim 8, wherein
the clamping rod is threaded; and
the threaded clamping rod and/or the securing means are coated with a high temperature anti-seize paste.

10. The assembly according to claim 1, wherein said at least two collecting ducts of the collector are each coupled with said at least one of the upper and lower clamping plates through a sealed detachable connector.

11. The assembly according to claim 10, wherein the sealed detachable connector is formed by a high temperature sealed coupling system, including:
a hollow base at least partially threaded on an external surface called a threaded base, made integral with said at least one of the upper and lower clamping plates and secured to an inner communication duct of the stack, the threaded base including a communication hole,
a hollow base having an at least partially smooth external surface called a smooth base, made integral with the collector and secured to a collecting duct of the collector, the smooth base including a collecting hole, the smooth base and the threaded base being positioned facing each other for being fluidly communicated with each other, and
a threaded nut configured to cooperate with the threaded base to form a screw/nut system and able to slide with respect to the smooth base, the threaded nut including, on an internal surface, a first threaded portion cooperating with the thread of the threaded base and a second smooth portion in slidable contact on the smooth external surface of the smooth base.

12. The assembly according to claim 11, wherein the smooth base, the threaded nut and the threaded base are made of a nickel-based superalloy and/or austenitic stainless steel.

13. A system, including:
the assembly according to claim 1; and
a heating system coupled with said SOEC/SOFC-type solid oxide stack of the assembly through the coupling system of the assembly for gas feed and outlet.

14. The assembly according to claim 1, wherein the lower clamping plate is sealed to the collector to a leakage lower than $2.10^{-5}$ Pa·m$^3$·s$^{-1}$.

15. The assembly according to claim 1, comprising a clamping washer cooperating with the one clamping rod and located between the second clamping nut and the lower clamping plate, the second clamping nut being secured against the clamping washer.

16. An assembly, comprising:
an SOEC/SOFC-type solid oxide stack operating at a high temperature, including a plurality of electrochemical cells each formed by a cathode, an anode and an electrolyte interposed between the cathode and the anode, and a plurality of intermediate interconnectors each arranged between two adjacent electrochemical cells;
a clamping system for the SOEC/SOFC-type solid oxide stack, including an upper clamping plate and a lower clamping plate, between which the SOEC/SOFC-type solid oxide stack is sandwiched, each clamping plate including at least two clamping holes, the clamping system further including:
at least two clamping rods each for extending through a clamping hole of the upper clamping plate and through a corresponding clamping hole of the lower clamping plate for assembling the upper and lower clamping plates to each other, and
clamping means at each clamping hole of the upper and lower clamping plates for cooperating with said at least two clamping rods for assembling the upper and lower clamping plates therebetween; and
a high temperature sealed coupling system for coupling said SOEC/SOFC-type solid oxide stack to a heating system for gas feed and outlet, the coupling system being detachable and enabling said SOEC/SOFC-type solid oxide stack to be electrically insulated, wherein the coupling system includes:
a collector comprising at least two collecting ducts for gas feed and outlet each provided with a collecting hole positioned facing a corresponding communication hole of at the lower clamping plate, and
at least two seals each placed between a collecting hole and a corresponding communication hole,
the collecting holes of said at least two collecting ducts of the collector are positioned facing corresponding communication holes of the lower clamping plate; and
the lower clamping plate is detachably disposed in contact with the seals and sealed to the collector only by the weight of the stack equipped with the clamping system.

17. The assembly according to claim 16, wherein the clamping means comprises:
a first clamping nut, cooperating with a first end of a first one of the clamping rods inserted through a first clamping hole in the upper clamping plate, and secured against an upper surface the upper clamping plate;
a second clamping nut cooperating with a second end of the first one of the clamping rods inserted through a second clamping hole in the lower clamping plate;
a third clamping nut, cooperating with a first end of a second one of the clamping rods inserted through a third clamping hole in the upper clamping plate, and secured against an upper surface the upper clamping plate; and
a fourth clamping nut cooperating with a second end of the second one of the clamping rods inserted through a fourth clamping hole in the lower clamping plate.

18. The assembly according to claim 17, comprising a clamping washer cooperating with the first one of the clamping rods and located between the second clamping nut and the lower clamping plate, the second clamping nut being secured against the clamping washer.

19. The assembly according to claim 16, wherein the lower clamping plate is sealed to the collector to a leakage lower than $2.10^{-5}$ Pa·m$^3$·s$^{-1}$.

20. A system, including:
the assembly according to claim 16; and
a heating system coupled with said SOEC/SOFC-type solid oxide stack of the assembly through the coupling system of the assembly for gas feed and outlet.

21. The assembly according to claim 1, wherein the at least two seals are located entirely within an outer periphery of the at least one of the upper and lower clamping plates and entirely within an outer periphery of the collector.

* * * * *